(12) United States Patent
Laubender et al.

(10) Patent No.: US 9,279,453 B2
(45) Date of Patent: Mar. 8, 2016

(54) RADIAL BEARING

(71) Applicant: Bosch Mahle Turbo Systems GmbH & Co. KG, Stuttgart (DE)

(72) Inventors: Jochen Laubender, Markgroeningen (DE); Thanh-Hung Nguyen-Schaefer, Asperg (DE)

(73) Assignee: Bosch Mahle Turbo Systems GmBH & Co. KG (DE)

( * ) Notice: Subject to any disclaimer, the term of this patent is extended or adjusted under 35 U.S.C. 154(b) by 0 days.

(21) Appl. No.: 14/391,996

(22) PCT Filed: Apr. 10, 2013

(86) PCT No.: PCT/EP2013/057468
§ 371 (c)(1),
(2) Date: Oct. 10, 2014

(87) PCT Pub. No.: WO2013/153102
PCT Pub. Date: Oct. 17, 2013

(65) Prior Publication Data
US 2015/0078690 A1     Mar. 19, 2015

(30) Foreign Application Priority Data

Apr. 12, 2012  (DE) .......................... 10 2012 205 950

(51) Int. Cl.
*F16C 33/10*     (2006.01)
*F16C 17/02*     (2006.01)
(52) U.S. Cl.
CPC ............. *F16C 33/1065* (2013.01); *F16C 17/02* (2013.01); *F16C 33/103* (2013.01); *F16C 33/1075* (2013.01); *F16C 33/1085* (2013.01); *F16C 2360/24* (2013.01)

(58) Field of Classification Search
CPC .... F16C 17/02; F16C 17/022; F16C 33/1055; F16C 33/1065
USPC .......................................... 384/286–291, 283
See application file for complete search history.

(56) References Cited

U.S. PATENT DOCUMENTS 1,940,301 A * 12/1933 Grobel et al. ................. 384/291
2,631,905 A    3/1953 Coppen
(Continued)

FOREIGN PATENT DOCUMENTS

DE    1477967 A1    6/1969
DE    2711983 A1    9/1977
(Continued)

OTHER PUBLICATIONS

English abstract for DE-102008000853.
(Continued)

*Primary Examiner* — Phillip A Johnson
(74) *Attorney, Agent, or Firm* — Fishman Stewart PLLC

(57) ABSTRACT

A radial bearing may include a bearing body, which includes a receiving space for a shaft to be arranged therein. The bearing body may have an inner wall facing the receiving space, in which transverse grooves running in an axial direction and separated from one another in a circumferential direction by separating portions are formed. The radial bearing may include a supply channel penetrating the bearing body provided in at least one separating portion. The at least one separating portion may have at least one oil pocket spaced from the associated supply channel.

20 Claims, 3 Drawing Sheets

(56) References Cited

U.S. PATENT DOCUMENTS

| | | | | |
|---|---|---|---|---|
| 2,901,297 | A | * | 8/1959 | Sternlicht .................. 384/291 |
| 4,105,267 | A | | 8/1978 | Mori |
| 4,427,309 | A | * | 1/1984 | Blake ........................ 384/286 |
| 5,456,535 | A | * | 10/1995 | Chen et al. ................ 384/398 |
| 6,095,690 | A | | 8/2000 | Niegel et al. |
| 6,393,818 | B1 | | 5/2002 | Nakagawa et al. |
| 6,729,763 | B2 | * | 5/2004 | Post et al. .................. 384/213 |
| 6,935,786 | B2 | | 8/2005 | Hirano et al. |

FOREIGN PATENT DOCUMENTS

| | | |
|---|---|---|
| DE | 19953576 A1 | 6/2001 |
| DE | 10119698 A1 | 10/2001 |
| DE | 60210187 T2 | 12/2006 |
| DE | 102008000853 A1 | 10/2009 |
| DE | 102009048460 A1 | 5/2011 |
| EP | 0677404 A1 | 10/1995 |
| GB | 1083956 A | 9/1967 |
| WO | WO-2011078499 A2 | 6/2011 |

OTHER PUBLICATIONS

English abstract for DE-102009048460.

English abstract for EP0677404.

English abstract for DE-19953576.

German Search Report for DE-10201220550.4, mailed Mar. 28, 2013.

* cited by examiner

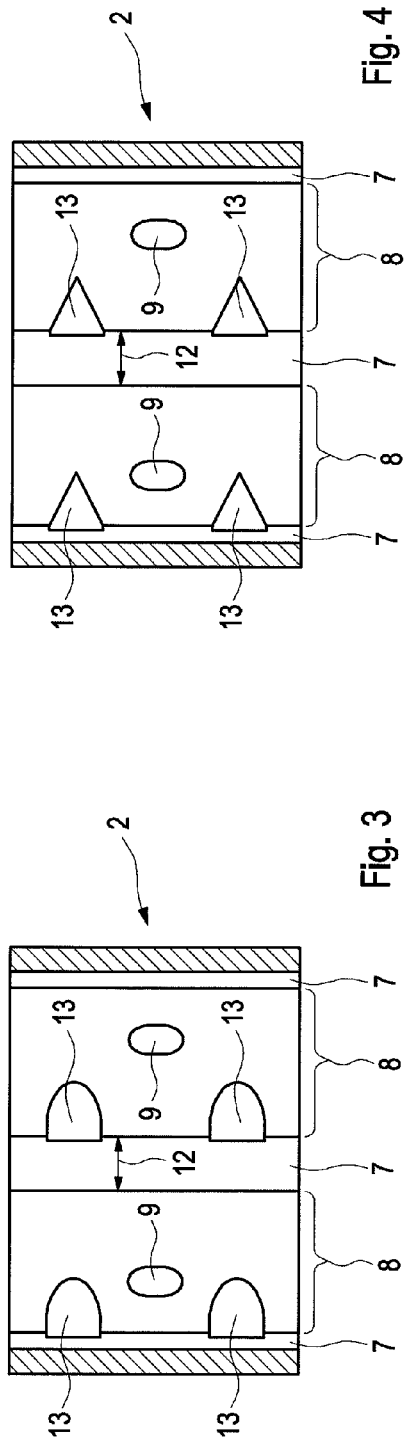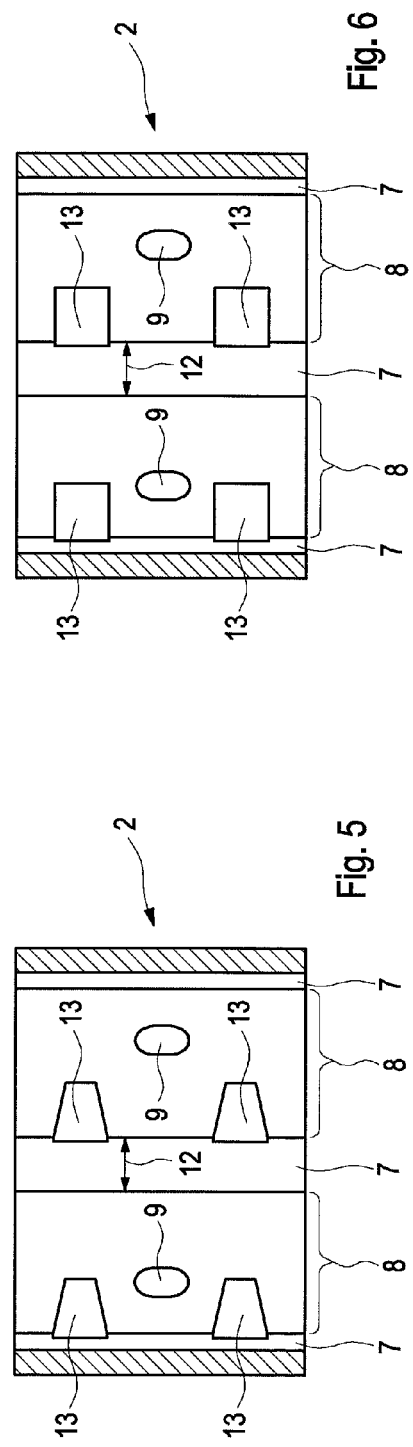

RADIAL BEARING

CROSS-REFERENCE TO RELATED APPLICATIONS

This application claims priority to International Patent Application PCT/EP2013/057468 filed Apr. 10, 2013 and German Patent Application No. 10 2012 205 950.4 filed Apr. 12, 2012, the contents of which are hereby incorporated by reference in their entirety.

TECHNICAL FIELD

The present invention relates to a radial bearing having a bearing body, in which a shaft can be arranged, with the features of the preamble of claim 1.

BACKGROUND

A radial bearing serves for mounting a rotating shaft and is employed for example in an exhaust gas turbocharger for an internal combustion engine. Such a generic radial bearing is known from DE 10 2008 000 853 A1. Here, the radial bearing comprises a cylindrically formed bearing body, which forms a receiving space for the shaft to be arranged therein. Within the bearing body, supply channels running in radial direction are provided, which feed a lubricant, for example lubricating oil to the receiving space, which lubricating oil upon rotation of the shaft disposes itself between the shaft and an inner wall of the bearing body facing the receiving space or the shaft in order to avoid a direct mechanical contact between the shaft and the inner wall. To avoid or reduce undesirable vibration effects, for example the so-called oil whirl and/or oil whip, multiple transverse grooves are formed in the inner wall, which run in the axial direction and are separated in the circumferential direction by separating portions, said supply channels being arranged in the separating portions. Here, a lubricant shortage can occur during the rotation of the shaft in the bearing body, in particular at high rotational speeds of the shaft, so that shaft and bearing body directly contact one another. This lubricant shortage results in an increased wear of the radial bearing and can at times result in a failure of the radial bearing.

SUMMARY

The present invention deals with the problem of stating an improved or at least other embodiment for a radial bearing of the generic type, which is characterized in particular by reduced wear and/or an extended service life.

According to the invention, this problem is solved through the subject of the independent claim. Advantageous embodiments are subject of the dependent claims.

The present invention is based on the general idea of equipping the inner wall of the bearing body in regions, where between the shaft and the inner wall direct contact due to a lubricant shortage can occur, with at least one oil pocket and thus making available a lubricant reservoir or lubricant store which supplies these regions with the lubricant in the case of a rotating shaft, so that said direct contact between the shaft and the inner wall is prevented or at least reduced. Here, the invention utilise the knowledge that such a lubricant shortage and consequently direct contacts between the shaft and the inner wall are in particular due to the shape of the inner wall, in particular the design of the transverse grooves and pre-dominantly occur in the region of the separating portions. Accordingly, the at least one oil pocket is arranged in such a separating portion.

According to the inventive idea, the radial bearing according to the invention comprises the bearing body, which comprises or forms the receiving space for the shaft to be arranged therein. Accordingly, transverse grooves running in the axial direction are formed transversely to the circumferential direction in the inner wall of the bearing body facing the receiving space, which are separated in the circumferential direction by said separating portions. Here, the axial direction is defined with respect to the longitudinal extension of the bearing body or of the shaft or through the axis of rotation of the shaft, while the circumferential direction relates to the inner wall. The bearing body is practically configured as a hollow cylinder so that the receiving space preferably has a circular cross section.

Furthermore, at least one such supply channel is provided, which penetrates the bearing body and to this end substantially runs in particular in radial direction and is arranged in such a separating portion. The supply channel is preferentially realised in the form of an opening or a bore in the bearing body, so that lubricant or lubricating oil or oil in brief can be conducted through the supply channel into the receiving space and in particular onto the inner wall of the bearing body. According to the invention, at least one such oil pocket spaced from the associated supply channel is formed in at least one such separating portion. Here, the oil pocket is preferentially designed in the form of a recess in the inner wall, in order to store and/or make available lubricant or oil, in order to prevent or at least reduce said direct contact between the shaft and the inner wall.

The respective transverse groove can in principle extend in axial direction over any axial length. Accordingly, the respective transverse groove preferentially has a larger dimension or is larger than the respective oil pocket. In particular, embodiments are conceivable, in which at least one transverse groove continuously runs in axial direction thus extending over the entire length of the axial body.

The radial bearing can in particular be configured as a rotatable radial bearing, in which the radial bearing, in particular the bearing body, is rotatably arranged in an associated housing, for example in an associated bearing housing of a charging device and can correspondingly rotate in the housing. Accordingly, this rotation takes place in circumferential direction and can take place in clockwise or anti-clockwise direction.

The spaced arrangement of the oil pocket from the associated supply channel is practically realised in such a manner that the oil pocket is arranged offset from the supply channel in the axial direction. Alternatively or additionally, the oil pocket is also arranged offset from the supply channel in the circumferential direction, wherein embodiments are preferred, in which the oil pocket is arranged offset from the supply channel both in the axial direction and also in the circumferential direction.

In a further advantageous embodiment, the oil pocket is arranged offset from the associated supply channel in a direction of rotation of the shaft in the circumferential direction. This serves in particular the purpose of conveying lubricant, which reaches the receiving space from the supply channel, into the oil pocket through the movement of the shaft.

Preferentially, the oil pocket is designed on such a transverse groove at least in regions. This means that the oil pocket can be open towards the transverse groove. In particular, the open oil pocket can merge into the transverse groove. Embodiments are also conceivable, in which the oil pocket is formed in such a transverse groove in regions. Here, a pocket depth of the oil pocket is preferably smaller along the radial direction than a transverse groove depth of the transverse groove running along the radial direction, in particular as a maximum transverse groove depth of the transverse groove depth.

Preferably, two such oil pockets are assigned to such a supply channel in order to improve the prevention or reduction of the direct contact between the shaft and the inner wall. Accordingly, the two oil pockets are preferentially evenly offset from the associated supply channel. This means that the two oil pockets have a same axial spacing from the supply channel. In addition, the two oil pockets can also have the same spacing from the supply channel along the circumferential direction.

The pocket depth of the respective oil pocket can in principle follow any course. Thus, the pocket depth along a longitudinal section running in the circumferential direction can in particular originate from a deepest point and follow an even or rising course. Alternatively or additionally, the pocket depth can in particular also originate along a cross section running in the axial direction follow an even or rising course from the deepest point. Accordingly, the pocket depth preferably runs in a rising manner in order to form a kind of "ramp" for the lubricant and thus supply the corresponding region of the inner wall with lubricant.

The pocket depth of the respective oil pocket can also follow a stepless or stepped course, a stepped course being preferred, in order to form within the oil pocket at least one region, from which it is difficult for the lubricant to get out, in particular flow out.

It is also conceivable to provide a separating portion with two or multiple oil pockets which are formed adjacent in the circumferential direction. Accordingly, the respective adjacent oil pockets can be arranged spaced from one another in the circumferential direction or directly adjacently. The arrangement of multiple oil pockets adjacent in the circumferential direction serves the purpose in particular to make available such a lubricant store or such a lubricant reservoir in an enlarged region of the separating portion in order to prevent or at least reduce the direct contact between the shaft and the inner wall even with elevated rotational speeds of the shaft.

Furthermore, the respective oil pocket can have a maximum depth of the pocket depth, which in the circumferential direction and/or in the axial direction is arranged offset from a longitudinal centre of a length of the oil pocket or from a width centre of the width of the oil pocket. Such a design of the oil pocket serves in particular the purpose of utilising or amplifying said ramp effect and/or allowing an improved storing of the lubricant within the oil pocket.

The receptive oil pocket can have any shape. Accordingly, the respective oil pocket can be of a quadrangular, in particular rectangular or trapezoid design. The respective oil pocket can also have a curved shape, in particular be designed in the form of an ellipse or in the form of a segment of an ellipse or in the form of a circle or in the form of a segment of a circle.

Furthermore, the bearing body, in particular the at least one pocket, can be produced in any way. The bearing body can be produced for example by working a flat work piece. Accordingly, the transverse grooves and/or the at least one oil pocket can for example be milled, bored, stamped and the like into the inner wall. The transverse grooves and the at least one oil pocket can also be worked into the inner wall through eroding, grinding, stamping, through an ECM-method and/or through a corresponding casting mould, through a PEM-method and the like. The flat work piece forming the bearing body is subsequently formed in order to form the receiving space of the bearing body. Accordingly, the flat work piece can for example be rolled up into a high cylinder and joined at the corresponding ends in the known manner, for example welded, soldered and the like.

It is to be understood that the inner wall of the bearing body can also have multiple such oil pockets, wherein individual or multiple oil pockets can each be designed differently or the same.

In preferred embodiments, the bearing body is designed annular groove-free. This means in particular that the bearing body on its inner wall does not have any groove or any annular groove running in circumferential direction. The annular groove-free design of the bearing body has the advantage in particular that during a stationary of the shaft a draining of the lubricant out of the interior space formed by the bearing body is prevented or at least reduced. Likewise, it is difficult for the lubricant during the stationary state to collect in a with respect to gravity lower region of the bearing body. Altogether, an improved, in particular more homogeneous storing of the lubricant takes place in the interior space, in particular in the oil pockets and/or the transverse grooves, so that it is available more rapidly and/or in a better distributed manner during the subsequent starting of the shaft.

Obviously, embodiments are also conceivable in which the bearing body also comprises at least one such annular groove, which runs closed or segment like or over a predetermined region in circumferential direction.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

A preferred exemplary embodiment of the invention is shown in the drawing and will be explained in more detail in the following description.

BRIEF DESCRIPTION OF THE DRAWINGS

It shows, in each case schematically
FIG. 1 a cross section through a radial bearing,
FIG. 2 a longitudinal section through a bearing body,
FIG. 3-6 the longitudinal section through a bearing body, in each case of a different embodiment,
FIGS. 7-12 a cross section through a bearing body, in each case of a different embodiment.

DETAILED DESCRIPTION

Figure 1:
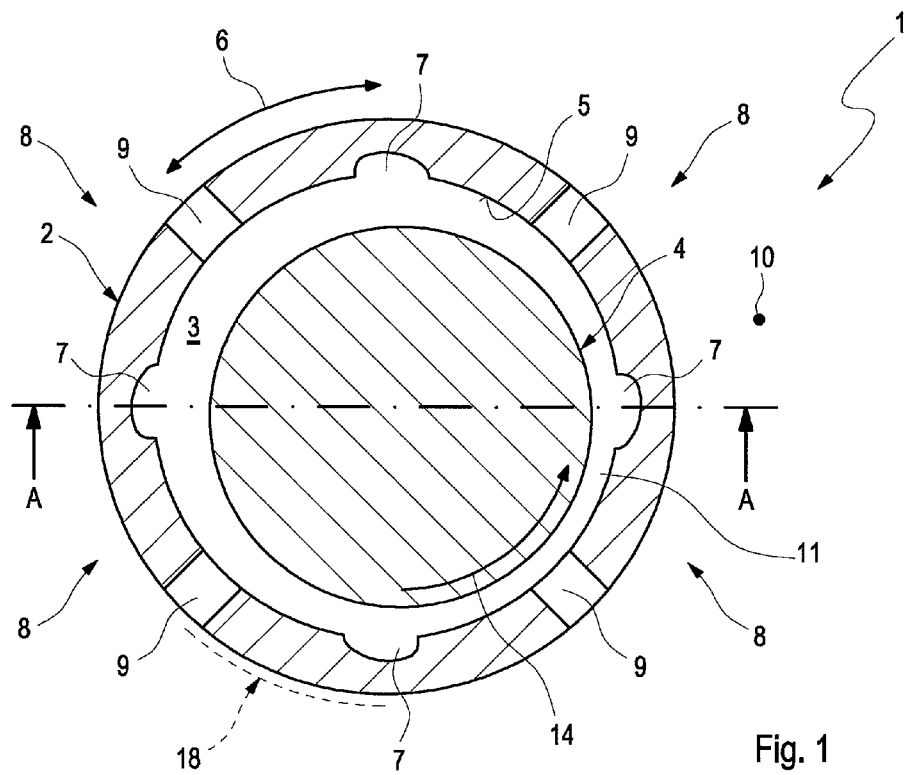

According to FIG. 1, a radial bearing 1 comprises a bearing body 2, which forms a receiving space 3, in which a shaft 4 can be arranged. Accordingly, the bearing body 2 is configured as a hollow cylinder and comprises an inner wall 5 facing the shaft 4 or the receiving space 3. In the inner wall 5, multiple, in the shown example, four transverse grooves 7 which are separated from one another in the circumferential direction indicated by an arrow 6 are formed, which run transversely to the circumferential direction 6. Between the transverse grooves 7 adjacent to one another in the circumferential direction 6, a separating portion 8 each is arranged, wherein in at least one of these separating portions 8 at least one supply channel 9 is formed, which runs in radial direction, wherein the radial direction is defined with respect to the axial direction 10 of the shaft 4 or of the bearing body 2 and accordingly runs perpendicularly to the axial direction 10. Here, the supply channels 9 and the transverse grooves 7 are each arranged evenly, i.e. with a spacing of approximately 90°, in the circumferential direction.

Here, the radial bearing 1 is configured for example as a rotatable radial bearing 1, so that the radial bearing 1, in particular the receiving space 3, is rotatably arranged in an associated housing 18 indicated by a dashed line, for example in a bearing housing 18. Here, the radial bearing 1, in particular the bearing body 2, can rotate in the circumferential direction 6 in clockwise or anti-clockwise direction.

Furthermore, the shaft 4 is designed smaller than the receiving space 3 of the bearing body 2, so that the shaft 4 in the receiving space 3 can slide along the inner wall 5. In order to avoid direct contact between the shaft 4 and the inner wall 5, the interior space 3 is supplied with a lubricant 11, in particular lubricating oil 11 or oil 11 in brief with the help of the supply channels 9, which penetrate the bearing body 2, which oil during the sliding of the shaft 4 along the inner wall 5 is arranged between the shaft 4 and the inner wall 5 in order to reduce the wear of the radial bearing 1.

Figure 2:
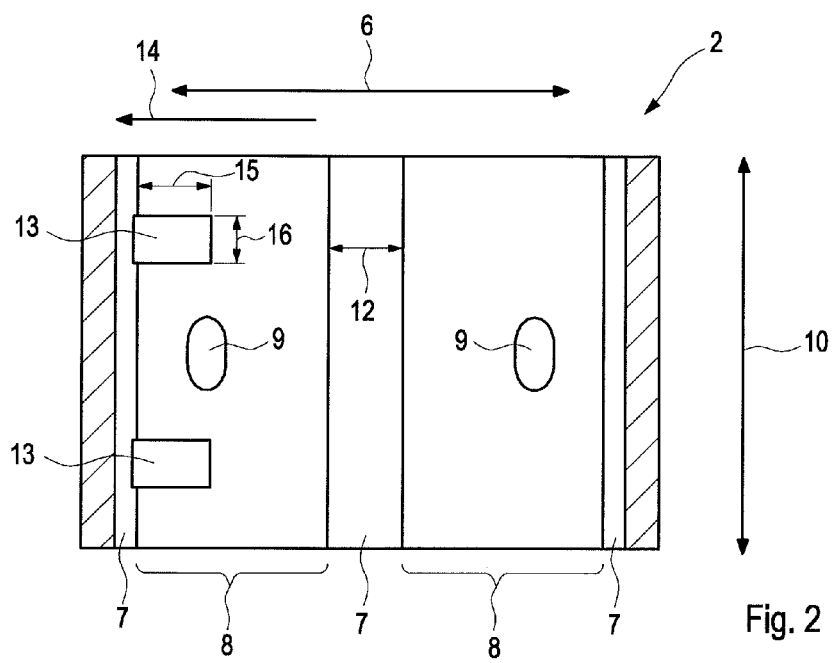

FIG. 2 shows a longitudinal section through the bearing body 2 along the plane designated AA in FIG. 1. Accordingly, the respective transverse groove 7 runs along the axial direction 10 and has a transverse groove width 12 running along the circumferential direction 6. According to the invention, at least one oil pocket 13 spaced from the supply channel 9 formed in this separating portion 8 is formed in at least one of the separating portions 8, wherein the embodiment shown in FIG. 2 has two such oil pockets 13 in one of the shown separating portions 8. Here, the respective oil pocket 13 is designed offset from the associated supply channel 9, wherein the shown oil pockets 13 are spaced from the associated supply channel 9 in a direction of rotation 14 of the shaft 4 in the receiving space 3 of the bearing body 2 along the circumferential direction 6. In addition, the oil pockets 13 are additionally arranged offset from the associated supply channel 9 along the axial direction 10, so that the oil pockets 13 altogether have a same axial spacing and a same spacing in circumferential direction from the associated supply channel 9. The oil pockets 13 are additionally arranged on the adjacent transverse groove 7, so that they are open towards this transverse groove 7.

In the FIGS. 3-6, the cross section shown in FIG. 2 for different embodiments of the radial bearing 1 or of the bearing body 2 is shown. Here, the embodiments shown in the FIGS. 3-6 in the shown region have two such oil pockets 13 for each separating portion 8, which in each case adjoin the adjacent transverse groove 7 and are arranged evenly offset from the associated supply channel 9. The oil pockets 13 shown in FIG. 3 are curved in shape, while the oil pockets 13 shown in FIG. 4 are triangular in shape. In comparison with this, the oil pockets 13 shown in FIG. 5 are trapezoidal in shape while the oil pockets 13 shown in FIG. 6 have a rectangular or square shape. Here, a length 15 (see FIG. 2) of the respective oil pocket 13 running along the circumferential direction 6 and a width 16 of the respective oil pocket 13 running along the axial direction 10 are identical in size in the respective embodiment.

Figure 7:
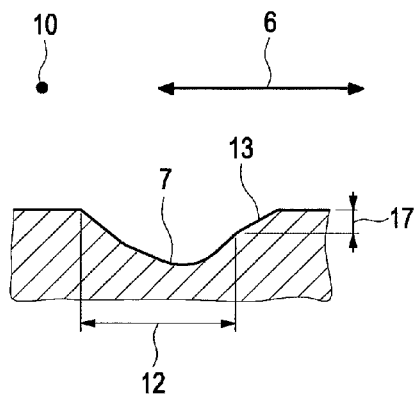

In the FIGS. 7-12, a section running along the circumferential direction 6 through such a transverse groove 7 is shown, wherein the FIGS. 7-12 an embodiment each is represented. In all examples shown in the FIGS. 7-12, the oil pocket 13 directly adjoins the adjacent transverse groove 7 and is open towards the same, while a pocket depth 17 running along the radial direction along the shown circumferential direction 6 follows a different course. Accordingly, the course of the pocket depth 17 of the oil pocket 13 in FIG. 7 is continuously linear, wherein the pocket depth 17 of the oil pocket 13 decreases towards the in the shown representation right side or towards the associated supply channel 9.

Figure 8:
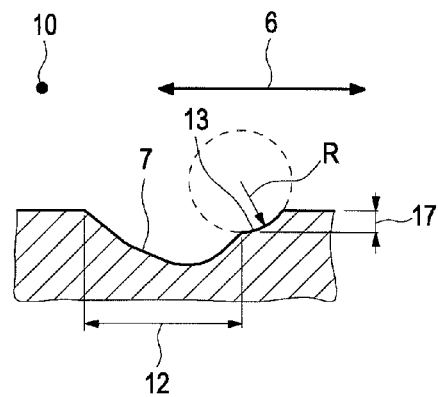
Figure 9:
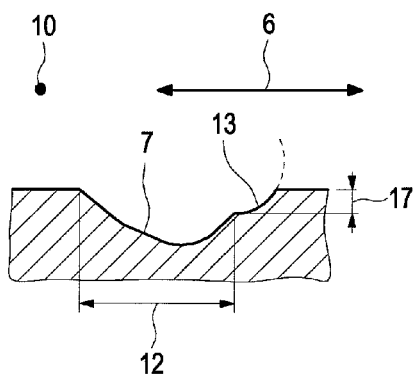
Figure 10:
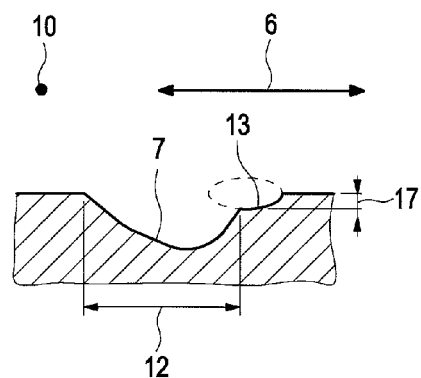

The course of the pocket depth 17 of the oil pocket 13 shown in FIG. 8 corresponds to that of a segment of a circle with the radius R. In the FIGS. 9 and 10, too, oil pockets 13 can be seen with which the course of the pocket depth 17 is continuous and curved, wherein the course of the pocket depth 17 in FIG. 10 is segment of an ellipse like.

Figure 11:
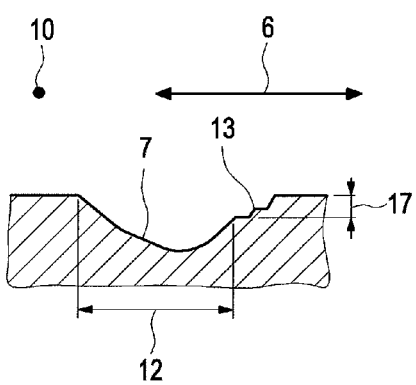
Figure 12:
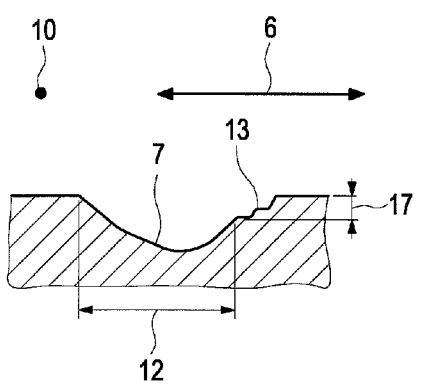

In the FIGS. 11 and 12, a discontinuous course of the pocket depth 17 each in the circumferential direction 6 is shown, wherein these examples show such a pocket depth 17, which is stepped. While the stepped pocket depth 17 shown in FIG. 11 has angular steps, the steps of the pocket depth 17 shown in FIG. 12 are embodied curved or round.

Accordingly, the pocket depth 17 of the respective oil pocket 13 can also have such a course along the axial direction 10.

The invention claimed is:

1. A radial bearing, comprising: a bearing body, which includes a receiving space for a shaft to be arranged therein, wherein the bearing body has an inner wall facing the receiving space, the inner wall including a plurality of transverse grooves running in an axial direction and separated from one another in a circumferential direction by a plurality of separating portions, and a supply channel penetrating the bearing body provided in at least one separating portion of the plurality of separating portions, the at least one separating portion having at least one oil pocket spaced from the supply channel.

2. The radial bearing according to claim 1, wherein the at least one oil pocket is arranged offset from the supply channel at least one of in the axial direction and in the circumferential direction.

3. The radial bearing according to claim 2, wherein the at least one oil pocket is arranged offset from the supply channel of the at least one separating portion in a direction of rotation of the shaft relative to the circumferential direction.

4. The radial bearing according to claim 2, wherein the at least one separating portion includes two oil pockets arranged offset from the supply channel at least one of in the axial direction and in the circumferential direction.

5. The radial bearing according to claim 1, wherein the at least one oil pocket is arranged offset from the supply channel in a direction of rotation of the shaft in the circumferential direction.

6. The radial bearing according to claim 5, wherein the at least one oil pocket includes a pocket depth running along a radial direction, wherein the pocket depth follows at least one of an even and rising course along at least one of a longitudinal section running in the circumferential direction and a transverse section running in the axial direction.

7. The radial bearing according to claim 6, wherein the pocket depth of the at least one oil pocket includes at least one step.

8. The radial bearing according to claim 5, wherein the at least one separating portion includes the supply channel and at least two oil pockets arranged offset from the supply channel in the direction of rotation.

9. The radial bearing according to claim 8, wherein the at least two oil pockets include equal axial spacing from the supply channel.

10. The radial bearing according to claim 1, wherein the at least one oil pocket is formed at least in regions on at least one transverse groove.

11. The radial bearing according to claim 1, wherein the at least one separating portion includes the supply channel and at least two oil pockets.

12. The radial bearing according to claim 11, wherein the at least two oil pockets have a same axial spacing from the supply channel.

13. The radial bearing according to claim 1, wherein the at least one oil pocket has a pocket depth running along a radial direction, wherein the pocket depth of the at least one oil pocket follows at least one of an even and rising course at least one of along a longitudinal section running in the circumferential direction and along a transverse section running in the axial direction.

14. The radial bearing according to claim 13, wherein the pocket depth of the at least one oil pocket follows a stepped course.

15. The radial bearing according to claim 1, wherein the at least one separating portion includes at least two oil pockets which are arranged adjacent in the circumferential direction.

16. The radial bearing according to claim 1, wherein the at least one oil pocket is formed at least one of quadrangular, triangular and curved.

17. The radial bearing according to claim 1, wherein the bearing body is produced by processing a flat work piece, which is subsequently formed.

18. The radial bearing according to claim 1, wherein the bearing body is formed annular groove-free.

19. The radial bearing according to claim 1, wherein the at least one oil pocket includes a pocket depth running along a radial direction, wherein the pocket depth includes at least one step.

20. A radial bearing, comprising:
a bearing body having a receiving space for a shaft, the bearing body including an inner wall facing the receiving space, the inner wall including a plurality of transverse grooves running in an axial direction and separated from one another in a circumferential direction via separating portions; and
a supply channel penetrating the bearing body disposed in at least one separating portion, wherein the at least one separating portion includes two oil pockets spaced from the supply channel;
wherein the respective oil pockets include a pocket depth running along a radial direction, the pocket depth of the respective oil pocket following at least one of an even and rising course along at least one of a longitudinal section running in the circumferential direction and a transverse section running in the axial direction, wherein at least one pocket depth includes a step.

* * * * *